(12) United States Patent
Weber et al.

(10) Patent No.: US 11,467,033 B2
(45) Date of Patent: Oct. 11, 2022

(54) METHOD FOR COMPENSATION IN A MEASURING SYSTEM

(71) Applicant: Endress+Hauser Conducta GmbH+Co. KG, Gerlingen (DE)

(72) Inventors: Frank Weber, Stuttgart (DE); Thilo Krätschmer, Gerlingen (DE); Felicia Seichter, Ludwigsburg (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 16/986,917

(22) Filed: Aug. 6, 2020

(65) Prior Publication Data

US 2021/0041294 A1   Feb. 11, 2021

(30) Foreign Application Priority Data

Aug. 7, 2019   (DE) .................. 10 2019 121 304.5

(51) Int. Cl.
*G01J 3/427*   (2006.01)
*G01N 21/31*   (2006.01)

(52) U.S. Cl.
CPC ............ *G01J 3/427* (2013.01); *G01N 21/314* (2013.01)

(58) Field of Classification Search
CPC .............................................. G01N 2201/127
See application file for complete search history.

(56) References Cited

U.S. PATENT DOCUMENTS

| 4,231,663 | A | | 11/1980 | Phillippi | |
|---|---|---|---|---|---|
| 5,554,539 | A | * | 9/1996 | Chadney | G01N 35/00594 436/8 |
| 2009/0015829 | A1 | * | 1/2009 | Rezac | G01N 21/65 356/301 |
| 2015/0142364 | A1 | * | 5/2015 | Workman | G01J 3/28 702/104 |
| 2016/0054275 | A1 | * | 2/2016 | Andrews | G01N 21/59 356/440 |

* cited by examiner

*Primary Examiner* — Shawn Decenzo
(74) *Attorney, Agent, or Firm* — Kelly J. Smith; Endress+Hauser (USA) Holding Inc.

(57) ABSTRACT

The invention relates to a method for compensation for different sensitivities at different wavelengths in a spectrometric measuring system, including steps of calibrating the measuring system in a wavelength range with respect to one or more known reference standards, creating a wavelength-dependent compensation algorithm for linearization, and adjusting the measuring system using the compensation algorithm. The invention further discloses a corresponding measuring system.

9 Claims, 6 Drawing Sheets

METHOD FOR COMPENSATION IN A MEASURING SYSTEM

Method for compensation for different sensitivities at different wavelengths in a spectrometric measuring system, such a measuring system, a computer program, and a computer-readable medium.

The problem underlying the invention will be described on the basis of the absorption sensitivity in optical spectroscopy in process automation. It can also be applied to the sensitivity of transmission, reflection or trans-reflection of spectrometers.

A measuring system comprises at least one light source, an operated spectrometer, and a data processing unit. The measuring system has a wavelength-dependent absorption sensitivity which is characterized by the installed spectrometer and the light source but also by all beam-shaping optical components of the system and their orientation with respect to one another. This results in different sensitivity profiles for different wavelengths, which has the effect that absorption for different wavelengths sooner or later deviates from an ideal straight line through the origin. FIG. 1 shows this behavior for individual wavelengths, i.e., the relationship between the target measurement signal to the actual measurement signal. In the ideal case, it is an angle bisector with a slope of "1"; in FIG. 1, this ideal correlation curve is identified by the reference sign "I." In the real case, however, this curve bends away sooner; the actual correlation curve (reference sign T) deviates from the ideal one. In a spectrometric measuring system, this problem occurs separately for each wavelength.

Thus, due to the wavelength-dependent refractive index, wavelength-dependent sensitivity curves of electro-optical components, different quality grades of the optical components, manufacturing tolerances in the construction of the probe, etc., each measuring system has a slightly different absorption profile for each wavelength, which leads to a different measured value (e.g., color) when interpreting using chemometric methods, especially at high absorptions.

The aim of the invention is to keep the sensitivity of a spectral measuring system the same over a desired wavelength range.

The aim is achieved by a method comprising steps of calibrating the measuring system in a wavelength range with respect to one or more known reference standards, creating a compensation algorithm for linearization, and adjusting the measuring system using the compensation algorithm.

The above-mentioned disadvantages are thus avoided through linearization by means of calibration and subsequent adjustment to at least one known standard by a compensation algorithm. This algorithm is wavelength-dependent.

The linearization also results in an expansion of the measuring range when a linear regression model is used and in an increase in robustness to manufacturing tolerances of the measuring system.

One embodiment provides that the reference standards are solid-state standards, such as gray filters.

One embodiment provides for the reference standard to be wavelength-independent.

A reference standard whose spectral properties are known, i.e., whose absorption, transmission, reflection are known over the wavelength range, is to be considered as a "known" reference standard. This is the case for gray filters, for example.

One embodiment provides that the compensation function for a wavelength to be linearized is configured in a closed form or as a point table.

One embodiment provides for linear interpolation between the points in the case of a point table.

One embodiment provides for the calibration and adjustment to be carried out at the location of the manufacturer of the measuring system.

One embodiment provides that creating the compensation algorithm includes determining an actual correlation curve, wherein the actual correlation curve is determined by a plurality of calibration points using the reference standards.

One embodiment provides that creating the compensation algorithm includes determining an actual correlation curve, wherein the actual correlation curve is determined by transforming an original correlation curve by a small number of, especially, one, two, or at most three, calibration points, the original correlation curve being generated by a plurality of calibration points using the reference standards and a plurality of measuring systems. One embodiment provides for a liquid standard to be used to determine the original correlation curve. One embodiment provides for a solid-state standard to be used to determine the actual correlation curve from the original correlation curve.

The object is furthermore achieved by a measuring system comprising at least one light source, a spectrometer, and a data processing unit which is designed to carry out the steps of the method as described above.

One embodiment provides that the spectrometer comprises at least one beam-shaping element, especially, a mirror, a dispersive element, especially, a grating or a prism, a receiver, especially, a CCD sensor, or a linear array detector, and an entrance slit.

One embodiment provides for the light source to be configured as a xenon flash lamp, gas-discharge lamp, incandescent lamp, or fluorescent lamp.

One embodiment provides for the light source to be configured as an LED.

The object is furthermore achieved by a computer program comprising instructions which cause the measuring system as described above to carry out the method steps as described above.

The object is furthermore achieved by a computer-readable medium on which the computer program as described above is stored.

This is explained in more detail with reference to the following figures.

Figure 2:
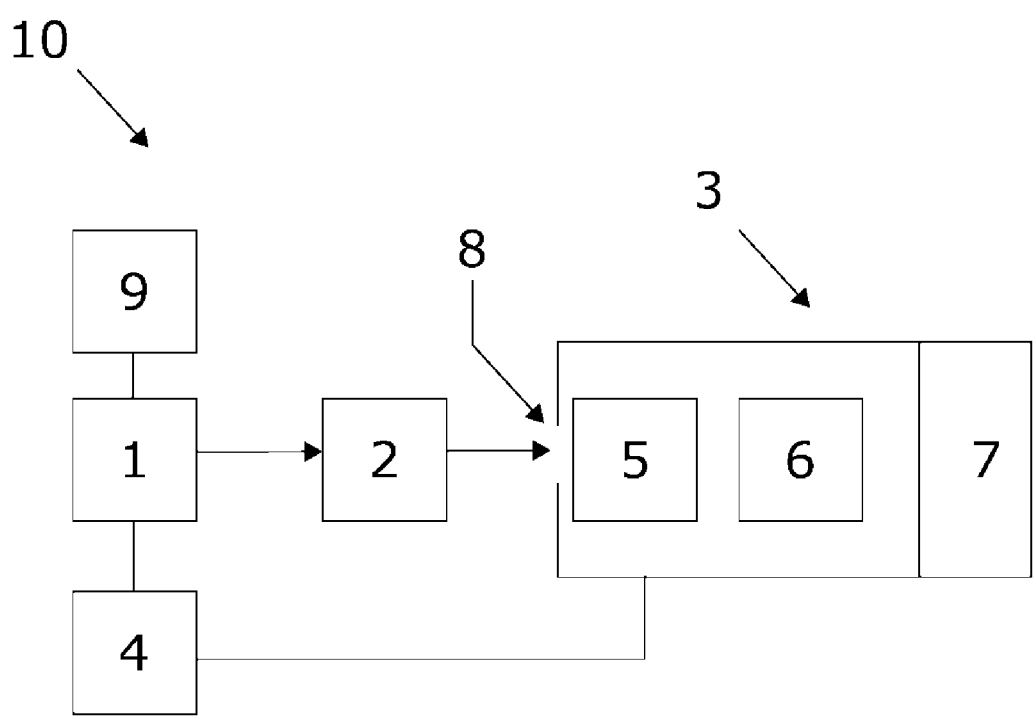
FIG. 2 shows an exemplary measuring system according to the present disclosure.

The claimed measuring system in its entirety is denoted by reference sign 10 and is shown in FIG. 2.

The measuring system 10 comprises at least one light source 1, a spectrometer 3, and a data processing unit 4 which is designed to carry out the steps of the claimed method, that is to say, for example, to switch the light source 1 on and off or to carry out the data processing.

The spectrometer 3 is only shown symbolically in FIG. 2 and comprises, for example, at least one beam-shaping element, for example a mirror 5, a grating 6 (in general, a dispersive element, for example also a prism) and a receiver 7. Mirror 5 and grating 6 can be configured as a single component. The receiver is configured as a CCD sensor or linear array detector. At the entrance of the spectrometer 3 is an entrance slit 8. In principle, the idea according to the invention works for all spectrometric measuring systems, irrespective of whether a prism or grating is used, for instance.

Light from the light source 1, which is configured, for example, as a xenon flash lamp, is transmitted from the light source 1 in the direction of the measuring medium 2. While the method for calibrating the spectrometer 3 is being carried out, the measuring medium 2 is replaced by a reference medium, such as a solid-state standard, for example a gray filter. The filter is thus arranged between light source 1 and spectrometer 3.

The light source 1 can also be designed as an LED. If the emission spectrum of the light source 1 is temperature-dependent, the measuring system 10 comprises a temperature sensor 9 which is arranged at, in, or at least in the vicinity of the light source 1. The emission spectrum can thereby be corrected with respect to the temperature if necessary.

A transmission measurement is shown. For this purpose, the light source 1 comprises one or more windows which are at least partially transparent to the emitted light. The measuring medium 2 is separated from the optical and electronic components of the measuring system 10 by the windows.

Figure 1:
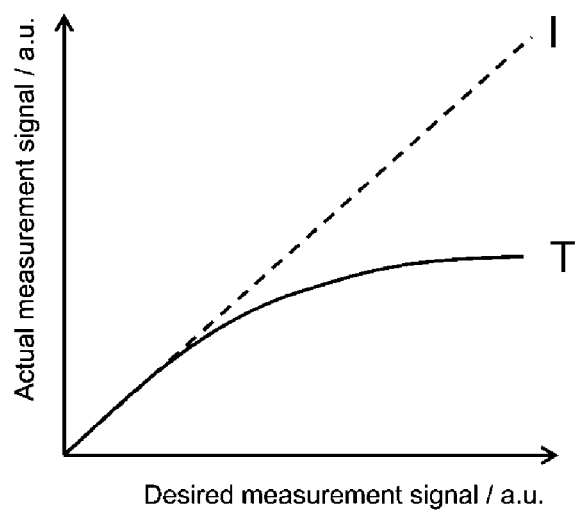
FIG. 1 shows the relationship between a target measurement signal to an actual measurement signal, for individual wavelengths.

As mentioned, the challenge of the present application is that different measured values are obtained at the same wavelengths by different measuring systems using spectrometers because of the optical components, etc. on account of the different sensitivities or different response characteristics, see also FIG. 1.

Figure 3:
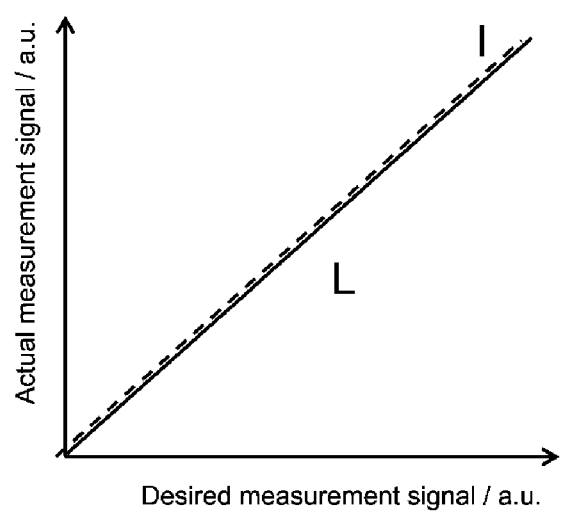
FIG. 3 shows a linearized correlation function.

This negative effect can be linearized by means of calibration and appropriate adjustment to one or more known standards by means of a compensation algorithm. This is shown in FIG. 3. If the actual correlation curve T (see FIG. 1) is known (see below), linearization now takes place as claimed by means of the compensation algorithm. The ideal correlation curve I (dashed line) is mapped nearly perfectly by the linearized correlation curve L (solid line; in FIG. 3, the two curves are drawn offset for the sake of visibility). The linear measuring range is thus expanded. The units are arbitrary and denoted by "a.u."

Figure 4:
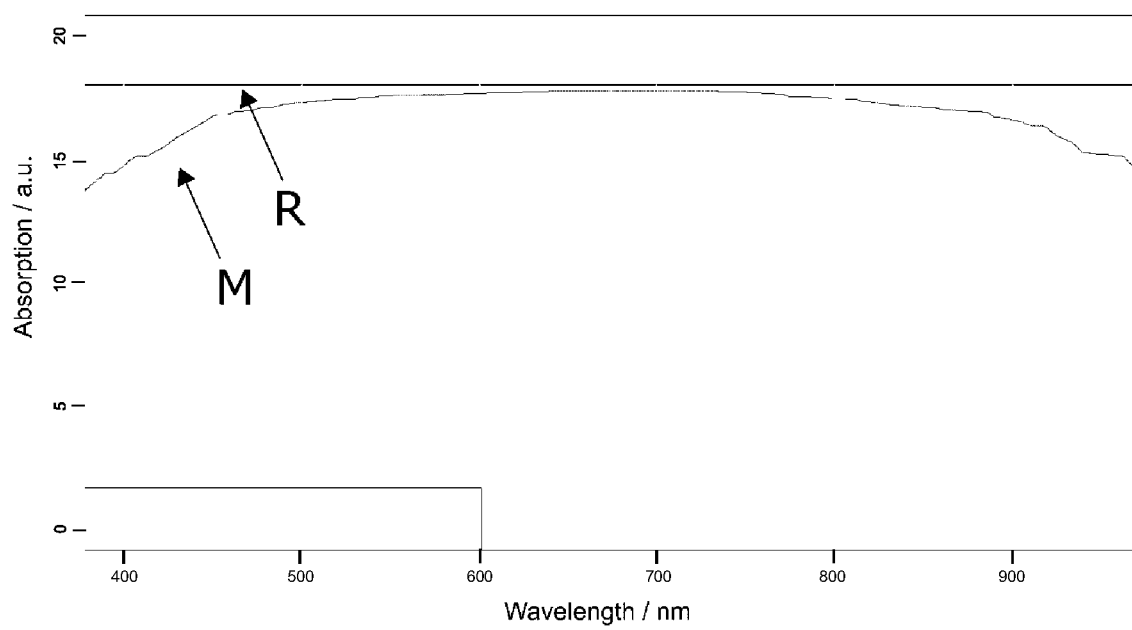
FIG. 4 shows an absorption spectrum for compensation.

This compensation algorithm is wavelength-dependent in order to compensate for the different sensitivity curves at different wavelengths, see FIG. 4. Absorption spectra in arbitrary units "a.u." are shown over the wavelength in nanometers (nm).

The reference spectrum R is realized, for example, with an idealized gray filter. The measurement spectrum M recorded with the measuring system 10 differs therefrom, especially at high and low wavelengths. The reference spectrum R can also be designed to be wavelength-independent.

In order to linearize the measuring system (of the measurement spectrum M) and thus to compensate for the different sensitivities at different wavelengths, the measuring system is first calibrated with respect to the reference standard, that is to say, the reference spectrum R. A wavelength-dependent compensation algorithm is then created for linearization. Lastly, the measuring system 10 is adjusted using this compensation algorithm.

For each wavelength, the compensation algorithm can be realized as, for example, a closed form or a point table. In the case of a point table, linear or non-linear interpolation between the points takes place.

The creation of the wavelength-dependent compensation algorithm includes determining the actual deviation from the ideal behavior I, i.e., determining the actual correlation curve T. The actual correlation curve T is determined by many calibration points T1, T2, . . . Tn (marked with a star) using the reference standards or the reference spectrum R. This is shown in FIG. 5.

In order to keep the implementation effort low, it is desirable for the calibration and subsequent adjustment to be carried out at only a few points (for example, at one or at two absorption points).

Figure 6:
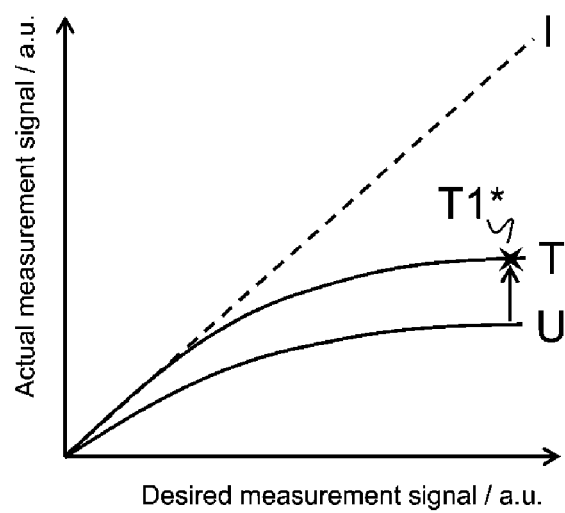
FIG. 6 shows an actual correlation function in one embodiment.

This variant is shown in FIG. 6. Starting from an original correlation curve U, an adjustment is made using one (as shown here as a star with reference sign T1*) or two or three but overall few points, and the actual correlation curve T is determined.

Figure 5:
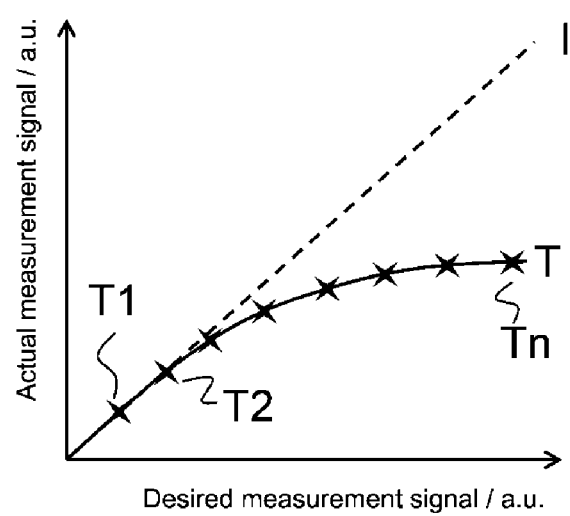
FIG. 5 shows an actual correlation function in one embodiment.

The original correlation curve U is determined once from many calibration points, similarly to the embodiment in FIG. 5, using many calibration points for many wavelengths and also using many different sensors. This results in a large number of calibration points. Thus, a one-time high amount of effort is required since many calibration points are determined using many sensors. This step usually takes place in advance at the factory of the manufacturer. Liquid standards are preferably used here.

This original correlation curve U is transferred later, for example during delivery or directly during use "in the field," to the respective sensors with one or two calibration points T1, or the original correlation curve U is transformed, for instance stretched, compressed, an offset subtracted or added, etc., by T1* into the actual correlation curve T. A solid-state standard is preferably used here.

It is assumed that the determined compensation algorithm, that is to say, the calibrated correlation curve, corresponds to the actual correlation curve T.

The use of solid-state standards (e.g., a gray filter) for calibration and adjustment minimizes the effort involved in implementation. In the case of calibration/adjustment using one or more liquids (e.g., ink solutions), path length variations are additionally corrected if present in the measuring system, but the calibration effort using liquids may be higher than for solid-state standards.

The invention claimed is:

1. A method for compensation for different sensitivities at different wavelengths in a spectrometric measuring system, comprising the steps of:
   calibrating the spectrometric measuring system at a plurality of wavelengths in a wavelength range with respect to one or more known reference standards, wherein each reference standard has known spectral properties over the wavelength range,
   creating a wavelength-dependent compensation algorithm for linearization, and
   adjusting the spectrometric measuring system at the plurality of wavelengths using the compensation algorithm.

2. The method of claim 1,
   wherein the reference standards are solid-state standards.

3. The method of claim 1,
   wherein the compensation algorithm for each wavelength to be linearized is configured in a closed form or as a point table.

4. The method of claim 3,
   wherein in a point table, linear interpolation is performed between the points.

5. The method of claim 1,
wherein creating the compensation algorithm includes determining an actual correlation curve,
wherein the actual correlation curve is determined using a plurality of calibration points using the reference standards.

6. The method of claim 1,
wherein creating the compensation algorithm includes determining an actual correlation curve,
wherein the actual correlation curve is determined by transforming an original correlation curve by three calibration points,
wherein the original correlation curve is generated by a plurality of calibration points by means of the reference standards and a plurality of measuring systems.

7. A spectrometric measuring system,
comprising at least one light source and a data processing unit designed to carry out the steps of the following method:
calibrating the spectrometric measuring system at a plurality of wavelengths in a wavelength range with respect to one or more known reference standards, wherein each reference standard has known spectral properties over the wavelength range,
creating a wavelength-dependent compensation algorithm for linearization, and
adjusting the spectrometric measuring system at the plurality of wavelengths using the compensation algorithm.

8. The spectrometric measuring system of claim 7,
wherein the light source is configured as a xenon flash lamp, gas-discharge lamp, or fluorescent lamp.

9. A non-transitory computer readable medium on which a computer program is stored, the program
comprising instructions which cause the spectrometric measuring system to carry out the following method:
calibrating the measuring system at a plurality of wavelengths in a wavelength range with respect to one or more known reference standards, wherein each reference standard has known spectral properties over the wavelength range,
creating a wavelength-dependent compensation algorithm for linearization, and
adjusting the measuring system at the plurality of wavelengths using the compensation algorithm.

* * * * *